United States Patent Office 3,469,759
Patented Sept. 30, 1969

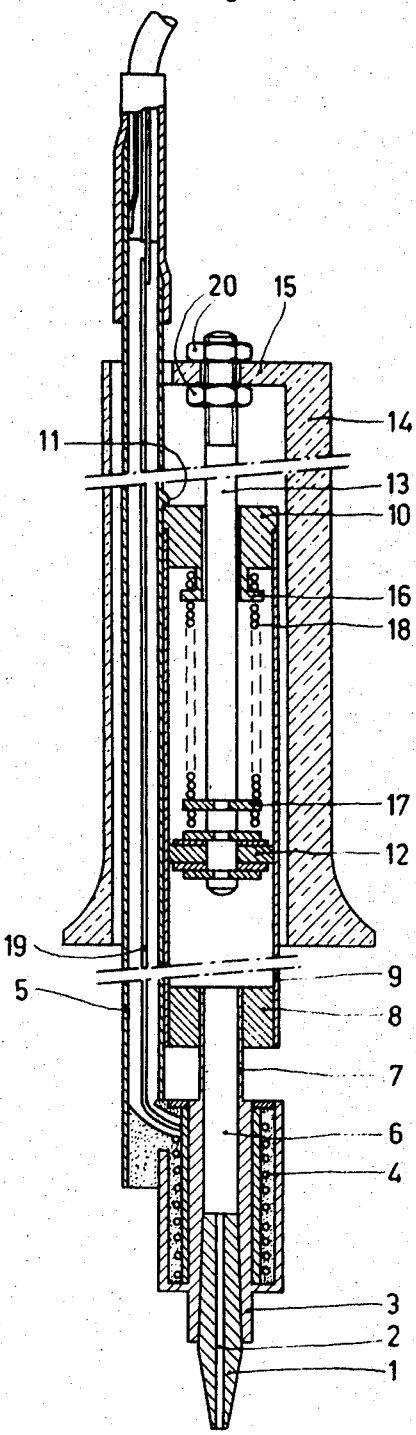

---

3,469,759
SUCTION SOLDERING IRON
Jan Herman Wansink, Emmasingel, Netherlands, assignor, by mesne assignments, to U.S. Philips Corporation, New York, N.Y., a corporation of Delaware
Filed Aug. 10, 1967, Ser. No. 659,805
Claims priority, application Netherlands, Aug. 24, 1966, 6611879
Int. Cl. B23k 3/00
U.S. Cl. 228—20
3 Claims

ABSTRACT OF THE DISCLOSURE

A suction soldering iron for heating and removing solder from a previously soldered connection. Suction is provided by a spring biased piston and cylinder arrangement. The handle of soldering iron is directly connected to the piston so that manually applying the heated soldering iron to the connection moves the piston to decrease the effective volume of the cylinder and removing the soldering iron increases the effective volume of the cylinder creating the suction force which withdraws the liquefied solder from the connection.

---

The invention relates to a suction soldering iron comprising a soldering tip provided with a bore, a heater element for this tip, a hollow cylinder communicating with the bore of the soldering tip, a piston resiliently arranged in the cylinder and a handle. Suction soldering irons are used, for example, for replacing electrical parts in printed-circuit mounting panels. The solder on each of the wires of the part to be replaced is first melted and then drawn from the connection. Thus individual parts can be readily replaced without the soldered connections of adjacent parts being interfered with.

Suction soldering irons are known in which molten solder is withdrawn from the connection by displacing the piston in the cylinder with the aid of a manually operated draw or pressure rod. Such a suction soldering iron is difficult to manipulate, since the soldering pin must be held for a short time by one hand at the point to be unsoldered, while at the same time the draw or pressure rod must be operated. Suction soldering irons are also known in which the piston is pressed against the force of a spring to one end of the cylinder and is locked in this stressed condition. When molten solder must be withdrawn, the piston is released, for example, by means of a draw rod, wherein the piston is moved to the other end of the cylinder by the spring force. A subatmospheric pressure is thus produced in the cylinder, as a result of which the molten solder is drawn into the cylinder. In this embodiment, the abrupt movement of the piston upon its release may give rise to a shock so that the soldering pin may be removed from the soldering area. Furthermore, the spring must be stressed for each operation.

According to the invention a suction soldering iron is provided in which the manipulation of the handle provides the force to operate the suction apparatus for withdrawal of molten solder from a connection. A piston is reciprocally positioned in a cylinder and thereby defines a suction chamber. A connecting rod couples the piston with the handle and a spring is interposed the piston and one end of the cylinder. At the other end of the cylinder is located a soldering tip having a bore therethrough in communication with the suction chamber. Axial movement of the handle in a first direction relative to the cylinder will cause the piston to move from a non-operating position towards the soldering tip and thereby reduce the effective volume of the suction chamber and conversely, movement of the handle in the opposite direction will cause the piston to return to a non-operating position and thereby expand the effective volume of the chamber and decrease the pressure therein which creates the suction.

Movement of the soldering tip into engagement with soldered connection of a component to be removed or repaired and application of a slight force on the handle in the direction of the component after engagement has occurred will provide the relative axial movement in the first direction. The spring biases the piston for movement in the opposite direction, hence removal of the slight force on the handle when the soldering tip is about to be withdrawn will permit the piston to return to the non-operative position under the biasing force applied by the spring. This return movement provides the suction which withdraws the solder from the connection.

The invention will now be described more fully with reference to the drawing.

The suction soldering iron includes a tip 1 provided with a bore 2. The tip is incorporated in a support 3 which accommodates a heater element 4. The support is secured, for example, by means of a hard solder to a tube 5 through which a current wire 19 is passed to a connection of the heater element 4. The other connection of the heater element and a second current wire are connected to the tube 5. As an alternative, however, the current wires may be both secured to a connection of the heater element. The support 3 is provided with a bore 6 which terminates in a tubular projecting part 7. The projecting part 7 is secured in a sleeve 8 which constitutes one end of a cylinder 9. The cylinder 9 is closed at its other end by a lid 10 adapted to be slipped into the cylinder. A stop 11 on the tube 5 locks the lid 10 against axial displacement. Cylinder 9 accommodates a piston 12, a piston connecting rod 13 has one end fastened to the piston 12 and the other end is passed through the lid 10 and is connected to the upper end 15 of a handle 14. A spring 18 is provided between a holder 16 forming part of the lid 10 and a ring 17 secured on the piston rod 13. The handle 14 is hollow so that it can be slipped with a certain amount of clearance on cylinder 9 and tube 5. The handle is secured to the rod 13 by nuts 20 or, if desired, by other means. When the spring 18 is stretched, it tends to move the handle 14 with respect to the cylinder 9 as shown in the figure.

The handle of the suction soldering iron is moved axially to a soldering area of a part to be replaced. When the tip 1 abuts against the soldering area, the handle 14 is moved slightly further so that it is displaced with respect to the cylinder 9. The piston 12 then moves towards the sleeve 8 thereby stressing the spring 18. After the tip 1 has liquefied the solder to be removed, the handle is moved back again. The tip initially continues to press against the soldering area and the spring 18 will be released, which results in a displacement of the piston 12 towards the lid 10. A subatmospheric pressure is thus produced in the portion of the cylinder forward of the piston 12 or suction chamber, as a result of which liquid solder flows through the bores 2 and 6 into the cylinder. After spring 18 has released completely, the whole soldering iron follows the movement of the handle and a next soldering area can be treated.

In order to remove solder solidified in the cylinder 9, the handle is displaced with respect to the cylinder in a direction away from the soldering tip. The lid 10 is then pulled with a certain amount of force across the stop 11 and the lid, the piston rod and the piston then move out of the cylinder. After the solidified solder has been removed from the cylinder, which is now open at one end, the handle is slipped again on the cylinder. After piston has returned into the cylinder and the lid 10 has been pushed across the stop 11, the soldering iron is again ready for use.

What is claimed is:

1. A suction soldering iron comprising: a cylinder, a piston reciprocally mounted in said cylinder, said piston and said cylinder defining a chamber forward of said piston, a soldering tip attached to said cylinder, a conduit means having one end intersecting said chamber and the other end adjacent said soldering tip, a handle, means coupling said piston and said handle, said handle being movable in a first direction for moving said piston from a first position in said cylinder to reduce the volume of said chamber, and spring biasing means coupled to said piston for returning said piston to said first position whereby the pressure in said chamber and said conduit is reduced.

2. A suction soldering iron according to claim 1 further comprising a heating element attached to said soldering tip.

3. A suction soldering iron according to claim 2 wherein said handle comprises a hollow cylindrical member open at one end, said cylinder is positioned interiorly of said handle, and said conduit means comprises a bore passing through the soldering tip.

References Cited

UNITED STATES PATENTS

| | | | |
|---|---|---|---|
| 2,609,778 | 9/1952 | Bleam | 228—20 |
| 2,826,667 | 3/1958 | Brillinger | 228—20 |

RICHARD H. EANES, Jr., Primary Examiner